US010990577B2

(12) United States Patent
Seager et al.

(10) Patent No.: US 10,990,577 B2
(45) Date of Patent: Apr. 27, 2021

(54) SERVICE REGISTRY FOR SAVING AND RESTORING A FACETED SELECTION

(71) Applicant: International Business Machines Corporation, Armonk, NY (US)

(72) Inventors: David J. Seager, Eastleigh (GB); Martin J. Smithson, Wherwell (GB)

(73) Assignee: International Business Machines Corporation, Armonk, NY (US)

( * ) Notice: Subject to any disclaimer, the term of this patent is extended or adjusted under 35 U.S.C. 154(b) by 214 days.

(21) Appl. No.: 14/816,772

(22) Filed: Aug. 3, 2015

(65) Prior Publication Data

US 2015/0339337 A1    Nov. 26, 2015

Related U.S. Application Data

(63) Continuation of application No. 12/685,733, filed on Jan. 12, 2010, now Pat. No. 9,137,206.

(30) Foreign Application Priority Data

Nov. 20, 2009    (EP) .................................... 09176589

(51) Int. Cl.
*G06F 16/23*    (2019.01)
*G06F 16/22*    (2019.01)
(Continued)

(52) U.S. Cl.
CPC .......... *G06F 16/23* (2019.01); *G06F 16/2291* (2019.01); *G06F 16/9024* (2019.01);
(Continued)

(58) Field of Classification Search
CPC ..... H04L 67/02; H04L 12/2807; H04L 67/16; H04L 41/22; H04L 41/0253;
(Continued)

(56) References Cited

U.S. PATENT DOCUMENTS 5,577,249 A * 11/1996 Califano .......... G06F 16/90344
707/694
6,539,371 B1    3/2003 Bleizeffer et al.
(Continued)

OTHER PUBLICATIONS

United States Patent and Trademark Office, Office Action for U.S. Appl. No. 12/685,733, dated Nov. 14, 2011, pp. 1-10, Alexandria, VA, USA.
(Continued)

*Primary Examiner* — Alex Gofman
*Assistant Examiner* — Linh Black
(74) *Attorney, Agent, or Firm* — Gilbert Harmon, Jr.; Christopher M. Pignato; Nicholas L. Cadmus

(57) ABSTRACT

An ordered sequence of two or more filter provider executable objects are associated, each configured to select successive subsets of data in a registry via a database upon a user request to create and configure a filtered selection. Upon a user selection of a save feature, each associated filter provider executable object is serialized in the ordered sequence, and each serialization is collected into an ordered list of serializations and saved. The serialization of each filter provider executable object is performed by one of the respective filter provider executable object and a filter provider executable object of a same type as the respective facet provider object. A selection statement is constructed from the associated filter provider executable objects in the ordered sequence. A difference between the constructed selection statement and an actual selection statement is calculated and the selection statement difference is appended to the saved ordered list of serializations.

12 Claims, 6 Drawing Sheets

(51) Int. Cl.
*G06F 16/901* (2019.01)
*G06F 16/9535* (2019.01)
*H04L 29/08* (2006.01)
*H04L 29/06* (2006.01)

(52) U.S. Cl.
CPC ...... *G06F 16/9535* (2019.01); *H04L 63/0227* (2013.01); *H04L 67/02* (2013.01)

(58) Field of Classification Search
CPC .. G06F 17/30873; G06F 9/44505; G06F 8/65; G06F 13/4278; G06F 16/9024; G06F 16/904; G06F 16/24535; G06F 16/84; G06F 8/10; G06F 9/541; Y10S 707/99945; Y10S 707/99932; Y10S 707/99934; Y10S 707/99948; Y10S 707/99931; Y10S 707/99933
USPC ............... 707/696, 711, 741, 754, 830
See application file for complete search history.

(56) References Cited

U.S. PATENT DOCUMENTS

| | | | | |
|---|---|---|---|---|
| 7,150,004 B2 * | 12/2006 | Russell | .............. | G06F 9/4493 717/118 |
| 7,184,919 B2 * | 2/2007 | Carbonell | .............. | G06F 8/71 702/117 |
| 7,213,013 B1 * | 5/2007 | Subramania | .............. | G06Q 10/10 707/610 |
| 7,698,398 B1 * | 4/2010 | Lai | .............. | G06F 8/10 709/223 |
| 7,861,252 B2 * | 12/2010 | Uszok | .............. | H04L 29/06 709/202 |
| 8,069,435 B1 * | 11/2011 | Lai | .............. | G06Q 10/10 717/106 |
| 8,099,709 B2 * | 1/2012 | Baikov | .............. | H04L 67/2804 717/104 |
| 8,346,929 B1 * | 1/2013 | Lai | .............. | G06Q 10/10 709/226 |
| 9,557,889 B2 * | 1/2017 | Raleigh | .............. | H04M 15/77 |
| 9,754,303 B1 * | 9/2017 | Jagtap | .............. | G06Q 30/0631 |
| 9,928,379 B1 * | 3/2018 | Hoffer | .............. | G06F 21/6245 |
| 2002/0147611 A1 | 10/2002 | Greene et al. | | |
| 2002/0198885 A1 | 12/2002 | Streepy, Jr. | | |
| 2004/0049522 A1 | 3/2004 | Streepy, Jr. | | |
| 2004/0054690 A1 * | 3/2004 | Hillerbrand | .............. | G06Q 10/06 |
| 2005/0050044 A1 * | 3/2005 | Takagi | .............. | G06F 17/30905 |
| 2005/0091231 A1 | 4/2005 | Pal et al. | | |
| 2005/0246716 A1 * | 11/2005 | Smith | .............. | G06F 9/541 719/315 |
| 2006/0074730 A1 * | 4/2006 | Shukla | .............. | G06Q 10/06 705/7.27 |
| 2006/0074734 A1 | 4/2006 | Shukla et al. | | |
| 2007/0112714 A1 * | 5/2007 | Fairweather | .......... | G06F 9/4493 706/46 |
| 2007/0174288 A1 * | 7/2007 | Stoyanova | .............. | H04L 67/02 |
| 2007/0192282 A1 | 8/2007 | Shriraghav et al. | | |
| 2008/0040320 A1 | 2/2008 | Dettinger et al. | | |
| 2008/0109424 A1 * | 5/2008 | Day | .............. | G06F 17/30477 |
| 2008/0228860 A1 * | 9/2008 | Angelov | .............. | G06F 17/30873 709/202 |
| 2008/0295003 A1 | 11/2008 | Behl | | |
| 2009/0006156 A1 * | 1/2009 | Hunt | .............. | G06Q 10/063 705/7.11 |
| 2009/0043824 A1 * | 2/2009 | Claghorn | .............. | G06F 16/93 |
| 2009/0119578 A1 | 5/2009 | Relyea et al. | | |
| 2009/0157419 A1 * | 6/2009 | Bursey | .............. | H04W 4/70 705/346 |
| 2009/0222412 A1 | 9/2009 | Lee et al. | | |
| 2009/0254422 A1 | 10/2009 | Jenkins et al. | | |
| 2009/0276764 A1 * | 11/2009 | Ghorbani | .............. | G06F 8/51 717/148 |
| 2010/0070448 A1 * | 3/2010 | Omoigui | .............. | H01L 27/1463 706/47 |
| 2010/0128998 A1 * | 5/2010 | Wegener | .............. | G06T 9/00 382/248 |
| 2012/0191716 A1 * | 7/2012 | Omoigui | .............. | H01L 27/1463 707/740 |

OTHER PUBLICATIONS

United States Patent and Trademark Office, Office Action for U.S. Appl. No. 12/685,733, dated May 17, 2012, pp. 1-12, Alexandria, VA, USA.
United States Patent and Trademark Office, Decision on PreAppeal for U.S. Appl. No. 12/685,733, filed Sep. 28, 2012, pp. 1-2, Alexandria, VA, USA.
United States Patent and Trademark Office, Office Action for U.S. Appl. No. 12/685,733, dated Feb. 8, 2013, pp. 1-13, Alexandria, VA, USA.
United States Patent and Trademark Office, Decision on PreAppeal for Application No. 12/685,733, filed Jun. 11, 2013, pp. 1-2, Alexandria, VA, USA.
United States Patent and Trademark Office, Office Action for U.S. Appl. No. 12/685,733, dated Oct. 2, 2014, pp. 1-20, Alexandria, VA, USA.
United States Patent and Trademark Office, Notice of Allowance for U.S. Appl. No. 12/685,733, dated May 8, 2015, pp. 1-10, Alexandria, VA, USA.
United States Patent and Trademark Office, Corrected Notice of Allowance for U.S. Appl. No. 12/685,733, dated Jul. 15, 2015, pp. 1-8, Alexandria, VA, USA.
Banerjee et al., "Scalable Grid Service Discovery Based on UDDI*", MGC '05, Nov. 5-Dec. 2, 2005 Grenoble, France, Copyright 2005 ACM 1-59593-269- 0/05/11, 6 pages.

* cited by examiner

SERVICE REGISTRY FOR SAVING AND RESTORING A FACETED SELECTION

BACKGROUND

This invention relates to a service registry and repository system and method. In particular this invention relates to a service registry and repository database system and method for a saving and restoring a faceted selection.

Service oriented architecture (SOA) is a business-driven information technology (IT) architectural approach that supports integrating the business as linked, repeatable business tasks, or services. The basic building block is a service document that defines a service so that it may be managed with other services. A service document contains information about a service including the location of the service and details about the service and how to access the service. Service documents may be used by analysts, architects, and developers during a Development Phase of the SOA life cycle to locate services to reuse and to evaluate the impact of changes to service configurations. Service documents are variously described as metadata, objects, descriptions, entities and artefacts.

A service repository stores the service document and allows access to the service document and thereby the corresponding service. A service registry is an index of a subset of information about a service (for example the location and name of service document) enabling the corresponding service document to be located and accessed in a repository (or even the corresponding service located at the service provider). An integrated service registry and repository allows a service operation to use both the indexed service information in the registry and the detailed service information in the repository. An example of an integrated service registry and repository is IBM® WebSphere® Service Registry and Repository (WSRR).

Such an integrated service registry and repository has advantages of greater business agility and resilience through reuse than separate systems. Further advantages of looser coupling, greater flexibility, better interoperability, and better governance arise from the integration. These advantages are addressed by separating service descriptions from their implementations, and using the service descriptions across the life cycle of the service. Standards-based service metadata artefacts, such as Web Service Definition Language (WSDL), extensible mark-up language (XML) schema, policy or Service Component Architecture (SCA) documents, capture the technical details of what a service can do, how it may be invoked, or what it expects other services to do. Semantic annotations and other metadata may be associated with these artefacts to offer insight to potential users of the service on how and when it may be used, and what purposes it serves.

A number of database applications provide users with the ability to refine a collection of data items by applying cumulative filters to the collection. As each filter is applied, the number of items in the collection is gradually reduced as the elements in the collection that do not match the filter are removed. When presented with a large collection of items this technique allows users to "drill down" to find the item or items that they are interested in. Some applications then allow the user to store the resulting selection away for later use. When the user runs the selection again, the filters that were applied are again presented so the user may further refine the selection. An example of such an application is the web-based user interface for IBM® WebSphere® Service Registry and Repository (WSRR).

Traditionally, drill down functionality has been implemented in one of two ways. First, the selection criteria may be expressed as a single selection string in some language such as extensible markup language (XML) Path Language (XPath). The problem with this solution is that applied filters may be stateful and the states may not be represented in the final selection string. An example of this in WSRR is the type of object the selection was previously filtered by before a Business Model filter was applied; this may be either GenericObject or BaseObject, but the selection string with a Business Model filter does not reflect this. Second, an algorithm to extract the selection criteria is implemented as a single, monolithic, process or function. The problem with this solution is that the filters may be based on various attributes of the items in the result set. Adding a new type of filter to the application may require changes to the application code and are, therefore, not a flexible solution.

SUMMARY

A method includes associating, via a database upon a user request to create and configure a faceted selection, an ordered sequence of two or more facet provider objects that each select successive subsets of data in a registry; serializing, upon a user selection of a save feature, each associated facet provider object in the ordered sequence, collecting each serialization into an ordered list of serializations, and saving the ordered list of serializations, where the serialization of each facet provider object is performed by one of the respective facet provider object and a facet provider object of a same type as the respective facet provider object; and constructing a selection statement from the associated facet provider objects in the ordered sequence, calculating a difference between the constructed selection statement and an actual selection statement, and appending the selection statement difference to the saved ordered list of serializations.

A system includes a database; and a processor programmed to: associate, via the database upon a user request to create and configure a faceted selection, an ordered sequence of two or more facet provider objects that each select successive subsets of data in a registry; serialize, upon a user selection of a save feature, each associated facet provider object in the ordered sequence, collect each serialization into an ordered list of serializations, and save the ordered list of serializations, where the serialization of each facet provider object is performed by one of the respective facet provider object and a facet provider object of a same type as the respective facet provider object; and construct a selection statement from the associated facet provider objects in the ordered sequence, calculate a difference between the constructed selection statement and an actual selection statement, and append the selection statement difference to the saved ordered list of serializations.

A computer program product includes a computer readable storage medium having computer readable program code, where the computer readable program code when executed on a computer causes the computer to: associate, via a database upon a user request to create and configure a faceted selection, an ordered sequence of two or more facet provider objects that each select successive subsets of data in a registry; serialize, upon a user selection of a save feature, each associated facet provider object in the ordered sequence, collect each serialization into an ordered list of serializations, and save the ordered list of serializations, where the serialization of each facet provider object is performed by one of the respective facet provider object and a facet provider object of a same type as the respective facet provider object; and construct a selection statement from the associated facet provider objects in the ordered sequence, calculate a difference between the constructed selection statement and an actual selection statement, and append the selection statement difference to the saved ordered list of serializations.

BRIEF DESCRIPTION OF THE DRAWINGS

Embodiments of the invention will now be described, by means of example only, with reference to the accompanying drawings in which.

DETAILED DESCRIPTION

Figure 1:
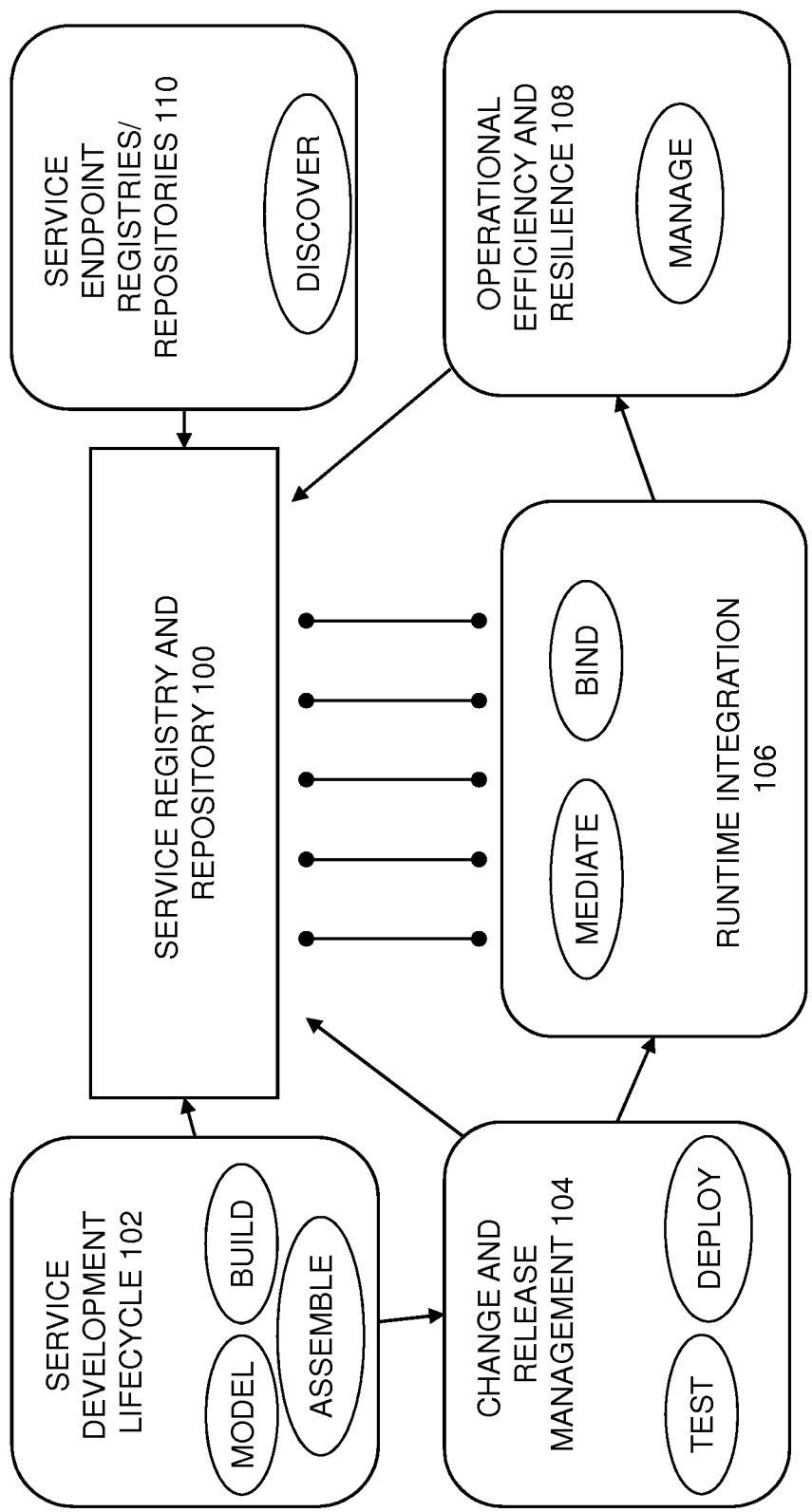
FIG. 1 is a block diagram of an example of an implementation of service document phases in a service registry and repository according to an embodiment of the present subject matter.

The framework of the present subject matter provides that the filter (e.g., facet) providers are responsible for serializing and deserializing their applied filters for a selection. The framework drives the filter provider to serialize any applied filters when a selection is being saved; it takes care of storing these serialized filters. It then drives the providers to deserialize their own filters, providing the serialized form to the provider when the selection is being re-created. In this description saving and re-creating a selection refers to the expressions that replicate the selection results and not the selection results themselves.

A framework is defined that allows different types of filter providers to be registered with the application declaratively. When the application is saving a selection, it delegates responsibility for serializing the applied filters on the selection to each of the registered filter providers or to a registered filter provider of a same type as the respective filter provider. Each filter provider is then able to inspect the applied filters and generate a serialized representation for a specific type of filter. For instance, a Classification Filter Provider may inspect the applied classification filters on the selection and generate a serialized representation of those filters. The framework may then collect each serialization into an ordered list of serializations. A selection statement may be constructed from the ordered list of serializations. A difference may be calculated between the constructed selection statement and an actual selection statement and the difference may be appended to the ordered list of serializations. When the application is recreating a selection, to run or display the results to the user, it delegates responsibility for deserializing the applied filters on the selection to each of the registered filter providers or to a registered filter provider of a same type as the respective filter provider. Each filter provider is then able to inspect the serialized form of its filters and create a representation of an applied filter for each specific filter that was applied. The application is responsible for storing and retrieving the serialized filters. Responsibility for the format of a serialized filter is thus delegated to each of the registered filter providers. The selection statement may be constructed from restored filter providers in the ordered list of serializations, where each stored selection statement difference is retrieved and appended to the constructed selection statement to recreate the actual selection statement.

The advantage of this approach is that it enables different types of filter providers to be registered with the application without needing to change any of the application code. When selections are saved, the applied filters from all types of filter providers may be saved. When selections are rerun, the applied filters from all types of filter providers may be recovered and displayed to the user. In WebSphere® Service Registry and Repository, this enables new filter types to be added without changing application code.

The framework defines a common abstract base class for all filter provider implementations. In this embodiment, filter providers are also referred to as facet providers. This base class implements some key functionality that is common to all filter providers. It also defines a number of abstract methods that each filter provider must implement. These methods provide the "hooks" that allow WebSphere® Service Registry and Repository to invoke each filter provider at the relevant point when saving or loading a selection.

The present subject matter uses a triplestore database to store data in a data structure comprising three pieces of information in the form of subject-predicate-object. The purpose of the triplestore is to increase performance in searching for information in a large volume of complex data, and, as such, is well suited to the application of a service registry and repository where the quantity and complexity of the data may be large.

The present subject matter provides a service registry and repository for service documents based on IBM® WebSphere® Service Registry and Repository. Such service documents include traditional Internet services that use a range of protocols and that are implemented according to a variety of programming models.

FIG. 1 is a block diagram of an example of an implementation of service document phases in a service registry and repository. FIG. 1 illustrates service life cycle phases of the services stored as documents in a service registry and repository 100 comprising: Service Development 102; Change and Release Management 104; and Runtime Integration 106 and Operational Efficiency and Resilience 108. As the integration point for service metadata, the service registry and repository 100 establishes a central point for finding and managing service metadata acquired from a number of sources, including service application deployments and other service metadata and service endpoint registries and repositories 110. Service metadata that is scattered across an enterprise may be brought together in the service registry and repository 100 to provide a single, comprehensive description of a service. Once this happens, visibility may be controlled, versions may be managed, proposed changes may be analyzed and communicated, usage may be monitored and other parts of the service architecture may access service metadata with the confidence that they have found the copy of record.

Architecture

Figure 2:
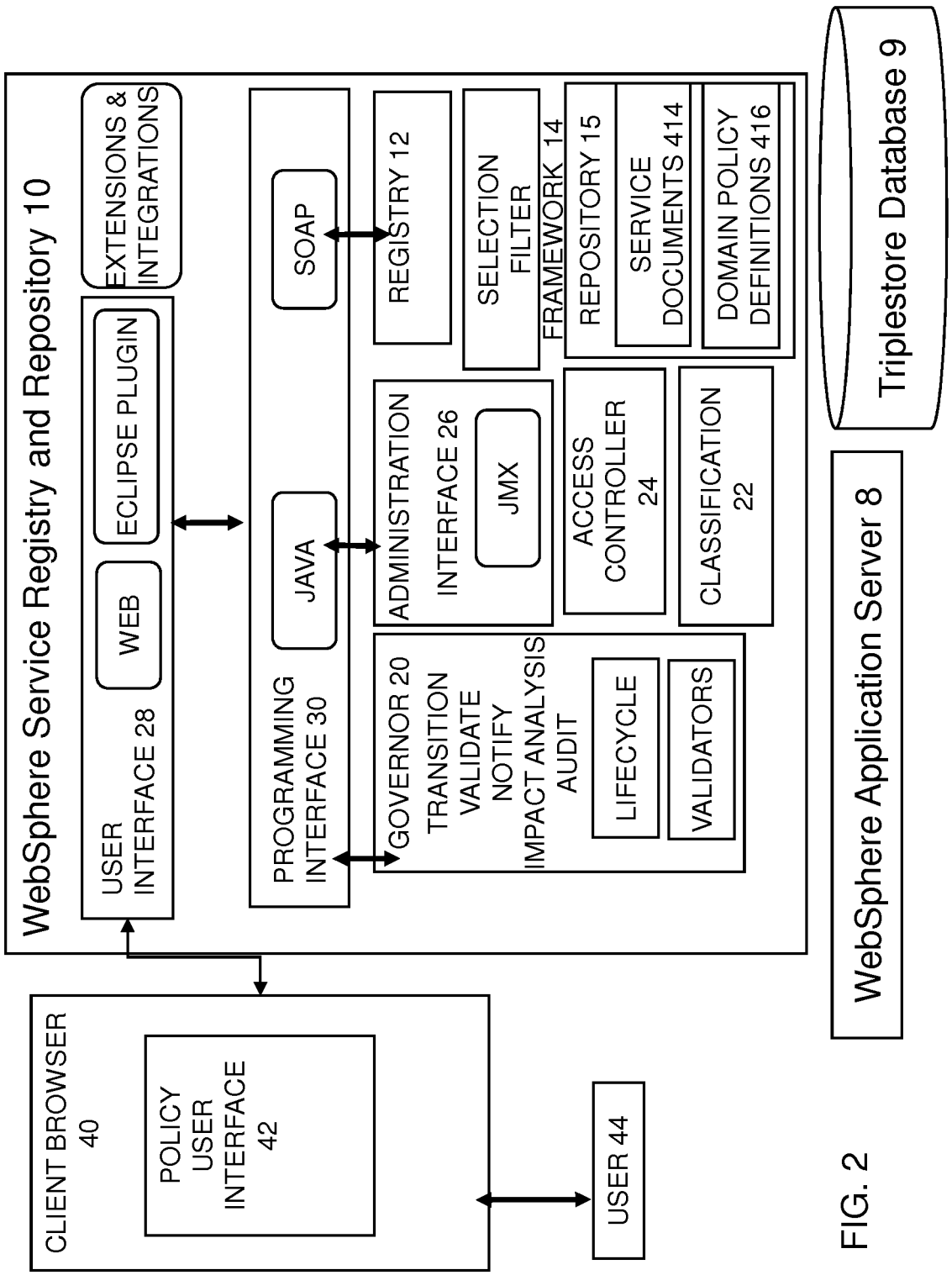
FIG. 2 is a block diagram of an example of an implementation of an architecture including a selection filter framework according to an embodiment of the present subject matter.

FIG. 2 is a block diagram of an example of an implementation of an architecture including a selection filter framework. A service registry and repository 10 may be implemented as a Java® 2 Platform Enterprise Edition (J2EE) application that runs on a WebSphere® Application Server 8 (See FIG. 2) and uses a triplestore database 9 as a backing store to persist the service metadata. The service registry and repository 10 takes advantage of the role-based access control so that role-based views and access control may be turned on when the service registry and repository 10 is deployed as an enterprise-wide application. Referring to FIG. 2, top level components of the service registry and repository 10 comprise: a registry 12; a repository 15; a governor 20; an administration interface 26; a user interface 28; and a programming interface 30.

The registry 12 offers both registry function and repository function for service metadata. The repository function allows users to store, manage, and query service metadata artefacts holding service descriptions. The registry 12 takes care of the documents containing service metadata by reliable persistence of the data, and also provides a fine-grained representation of the content of those documents (for example, ports and portTypes in some service documents). The registry function makes provision for decorating registered service declarations and elements of the derived content models with user-defined properties, relationships, and classifiers. The registry 12 provides a selection filter framework 14 for selection filter plugins.

Repository 15 stores all artefacts including policy documents 414 and domain policy definitions 416.

A classification component 22 allows service descriptions and parts of service definitions to be annotated with corporate vocabulary and to capture the governance state. Service classification systems are captured in web ontology language (OWL) documents that are loaded into the Service Registry and Repository 10 using the administrative interface 26. Service registry and repository 10 entities may be classified with values from these classification systems, to allow classification-based queries to be performed, and to allow access restrictions based on classification.

An access controller 24 supports a fine-grained access control model that allows for the definition of which user roles may perform specific types of actions on corresponding artefacts. Visibility of services may be restricted by business area and user roles may be restricted from transitioning services to certain life cycle states. This is in addition to the role-based access control provided by the service registry and repository 10.

The administration interface 26 supports the import and export of repository content for exchange with other repositories and provides an application programming interface (API) for configuration and basic administration. These support interactions with the Access Controller 24 and with the Classification component 22.

The user interface 28 comprises a web interface and an Eclipse® plug-in interface to enable interaction with service registry and repository. A servlet based web user interface (UI) may be the main way for users representing different roles to interact with the service registry and repository. The web interface supports all user roles, offering lookup, browse, retrieve, publish, and annotate capabilities, as well as governance activities, such as import/export and impact analysis. A subset of this user interface is offered as an Eclipse® plug-in to meet the needs of developers and analysts who use Eclipse® based-tooling. The Eclipse® plug-in is used primarily for lookup, browse, retrieve and publish capabilities. The Web-based user interface may also be used for performing service metadata management and governance.

The programming interface 30 may use Java® and SOAP (Service Oriented Architecture Protocol) APIs to interact programmatically with registry and repository core 12. These APIs provide basic create, retrieve, update and delete (CRUD) operations, governance operations, and a flexible query capability. The SOAP API may be used to communicate content using XML data structures. The Java® API may be used to communicate content using service data object (SDO) graphs. Using either the user interface 28 or the programming interface 30, documents and concepts managed by WSRR may be created, retrieved, updated and deleted. However, logical entities in the logical model may not be modified and these may be changed by updating a document that contains the logical entity. Concepts may be created, retrieved, and deleted.

The service registry and repository 10 may support Java®-based application programming interfaces (API) and a SOAP-based API that may be used to interact with the registry 12; the repository 15; the governor 20, and the administration interface 26. Both APIs support publishing (e.g., creating and updating) service metadata artefacts and metadata associated with those artefacts, retrieving service metadata artefacts, deleting metadata, and querying the content of the registry and repository. The programming APIs use Service Data Objects (SDO) to capture the data graphs inherent in the content model, allowing access to physical documents, logical parts of the physical documents, and concepts. The SOAP API uses XML documents to similarly represent Service Data Objects to communicate content structures in both the physical and logical model.

Information Architecture

Figure 3:
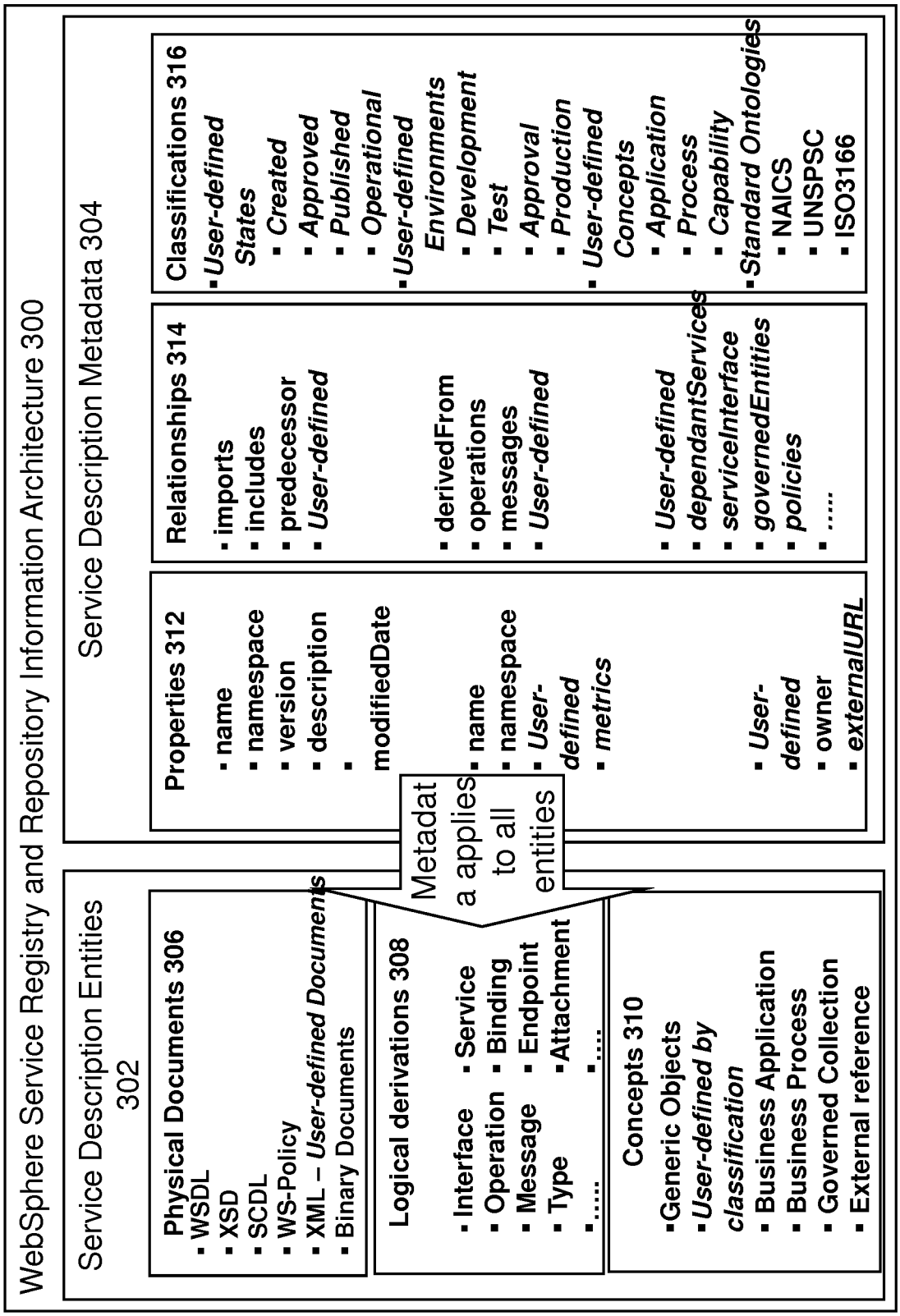
FIG. 3 is a schematic of an example of an implementation of an information architecture according to an embodiment of the present subject matter.

Referring to FIG. 3, FIG. 3 is a schematic of an example of an implementation of an information architecture 300 of the present subject matter. Information architecture 300 has entities representing service description entities 302 and service description metadata 304. All artefacts have an assigned uniform resource identifier (URI), a name, and a description. Examples of each type of artefact are shown in FIG. 3, but are not necessarily referred to in the description.

Service Description Entities 302 comprises physical documents 306, logical derivations 308, and concepts 310. Physical Documents 306 are XML documents that are known as service metadata artefacts. Logical derivations 308 are finer-grained pieces of content that result when some types of physical document are shredded as they are loaded into Registry and Repository 10. Concepts 310 are generic entities that are usually typed, and represent anything that is not represented by a document in Registry and Repository 10. All three types of service description entities may be use in queries, have service annotations applied, and have relationships established from and to them.

The most elemental building blocks for the WSRR 10 are the physical documents 306 such as XSD, WSDL, SCDL or WS-Policy documents. In addition, any XML service metadata artefact type or binary document may be stored in the WSRR 10 and receive the benefits of broader visibility, reuse, management, and governance. The coarse-grained model made up from registry objects that represents those documents is referred to as the physical model. Documents are versionable objects in the WSRR content model, which means that in addition to a URI, name, and description, they also have a version property.

For some of the physical document types, WSRR 10 derives logical objects and stores them in the logical derivations 308. For instance, the WSRR 10 shreds a document upon receipt into a set of logical objects to enable users to explore WSRR content beyond the boundaries of the files stored. Logical objects are not versionable. For some physical document types, the WSRR 10 defines predefined properties and detects relationships to other physical documents. An XSD document, for example, has a target namespace property and the relationships with other imported XSD documents, other redefined XSD documents, and other included XSD documents. When an entry for a certain physical document is created in the WSRR 10, it is inspected for relationships to other artefacts. If not already represented in the WSRR 10, a related artefact is also added, and in either case the relationship between the artefacts is recorded.

The set of logical derivations comprises the logical model of the WSRR 10. The logical model has entities such as portType, port, and message related to WSDL files, and complexType or simpleType related to XSD documents. Elements of the logical model have properties and relationships reflecting a subset of their characteristics as defined in the underlying document. For example, a WSDLService element has a namespace property and a relationship to the ports it contains. It should be noted that all individual results of document shredding are aggregated into one logical model that represents not only the content of individual documents, but also relationships between content in different documents.

The WSRR 10 stores other types of service metadata using the XML document, a generic document type. Documents of type XMLDocument are not decomposed into the logical model.

The WSRR 10 uses a concept to represent anything that does not have a physical document. The concepts 310 are used to represent a reference to content in some other metadata repository, such as a portlet in a portlet catalogue or an asset in an asset repository. It may also be used to group physical artefacts together to govern them as a unit; for example, concepts may be versioned.

In addition to content directly related to the service description entities 302, the WSRR 10 supports a number of metadata types that are used to describe the service description entities 302. These metadata types are referred to as the service description metadata 304. The WSRR 10 supports three types of service semantic metadata types: properties 312; relationships 314; and classifications 316. All three types describe physical model entities, logical model entities, and/or concepts. For example, service description metadata 304 may be used to associate a property "businessValue" with a physical model entity representing a WSDL file. It might also be used to define a new relationship "makesUseOf" between an entity in the logical model representing a "portType" and an entity in the physical model representing an XML document. Furthermore one may create a classification of "importantThings" and associate it with a "port" entity in the logical model and with an entity in the physical model representing a "Policy" document. This enables semantic queries to target individual elements of the service metadata, and meaningful dependency analyses to take place prior to making changes.

The properties 312 may be name/value pairs that are associated with any of the Service Description Entities 302. Some properties may be assigned by the system, such as a unique identifier (e.g., id), an owner, and the last time the service entity was changed. These system-assigned properties may not be changed. Other properties may be derived through the "shredding" of a key-type service description document into its logical model. Properties of this type include name and namespace. Sometimes these system-assigned values are allowed to be changed and properties may be created. Such a user-defined property may be used as an unstructured and untyped extension mechanism. The properties 312 may be used in queries and may be used to establish fine-grained access control.

The relationships 314 tie together one source service description entity to one or more target service description entities. Every relationship is given a name and a source is only allowed to have a single relationship with a given name. Some relationships are assigned by the WSRR 10 during the "shredding" of key types of documents. The relationship established between XSD documents based on the importing of one into the other is one such system-assigned relationship. Relationships may also be user defined. For example, a user may: relate a concept that represents an external object to a service using a user-defined relationship; relate all of the service description documents that will be governed as a unit to a governable entity; and/or relate a monitoring policy to a service endpoint.

A user may load the classification 316 into registry 12 where it may then be used to apply semantic meaning to the service description entities 302. Classification systems are documents encoded using the Web Ontology Language (OWL). The registry 12 represents OWL Classes as classifiers and interprets the subTypeOf relationship between those Classes as establishing a classifier hierarchy. Other OWL concepts such as data or relationship representing properties or other built-in OWL relationships may be ignored. A classification system is imported into the registry as a whole and updates may be made by importing a modified version of the ontology. Any class in the underlying ontology may be used as a classification; the same classification may be used to classify multiple entities and an entity may be associated with multiple classifications.

Framework for Selection Filter Plugins

Presently some database applications provide users with an ability to refine a collection of items by applying cumulative filters to the collection. As each filter is applied, the number of items in the collection is gradually reduced as the elements in the collection that do not match the filter are removed. When presented with a large collection of items this filtering technique allows users to 'drill down' to find the item or items that they are interested in. One example of such an application is the web based user interface IBM® WebSphere® Service Registry and Repository (WSRR).

Traditionally, the functionality to refine a collection of items with filters has been implemented in one of two approaches. In the first approach, the items in the collection are retrieved from a fixed list and filtered in memory. The problem associated with the first approach is that filtering is done in memory, and thus changes on the server are not reflected when filtering occurs. In the second approach, an algorithm that extracts the filters from the result set is implemented as a single, monolithic, process or function. The problem with the second solution is that the filters may be based on various attributes of the items in the result set.

Adding a new type of filter to the application may require changes to the application code and this is, therefore, not a flexible solution.

Embodiments of the present subject matter provide a method and system that filter web service definitions, as well as other types of information that may be stored in a service registry. The filters provided by embodiments of the present subject matter execute within the service registry itself, and are centrally located within the service registry, and are not provided as add-ons to the web service itself. The filters provided by embodiments of the present subject matter operate on metadata that is associated with artifacts in the service registry in order to refine the collection of artifacts.

Embodiments of the present subject matter define a framework for various types of filter providers to be registered with an application declaratively. In embodiments of the present subject matter, in the event an application is displaying a collection of objects (usually as the result of a selection), the present subject matter delegates responsibility for extracting the filters from the objects to each of the registered filter providers. Each filter provider is configured to inspect each of the objects and generate filters of a specific type. For example, a classification filter provider may inspect the classifications for each object, and generate one or more classification-based filters for display, while a document type filter provider may inspect the type of each object and generate document-type-based filters (if appropriate).

Some data facets are classifications arranged in a hierarchy of classes, with parent and child classes. A class represents a specific classification which may be applied to an entity, for example a "Service" class may be applied to entities in a registry which represented a Service of some sort. Given a specific class in a hierarchy, a class which is above it in the hierarchy is its superclass. A class which is below it in the hierarchy is its subclass. For example a hierarchy describing fruit may consist of a top-level class of "Fruit" with a subclass of "Fleshy", "Fleshy" with a subclass of "Berry", "Berry" with a subclass of "Orange". (e.g., Hierarchically: "Fruit"→"Fleshy"→"Berry"→"Orange"). In this scheme, "Fleshy" is a subclass of "Fruit", "Fruit" is a superclass of "Fleshy", "Orange" is a subclass of "Fruit" and "Fruit" is a superclass of "Orange". "Berry" is the immediate superclass of "Orange" and "Orange" is the immediate subclass of "Berry".

In implementations of embodiments of the present subject matter in WSRR, filterable collections are generated as a result of a selection, which is represented as an extensible markup language (XML) Path Language (Xpath) expression. XPath is a language for selecting nodes from an XML document. In addition, XPath may be used to compute values (strings, numbers, or Boolean values) from the content of an XML document.

In embodiments of the present subject matter, this XPath selection may be modeled and stored by the system as a Java® object tree. In an application configured with embodiments of the present subject matter, a framework allows different types of filter providers to be registered with the application declaratively. If an application is searching for a collection of objects (e.g., with various filters applied), the application uses the XPath selection model to create the selection to execute.

If a filter is applied, an application delegates responsibility for modifying the XPath model to apply the filter to each of the registered filter providers. Each filter provider may then generate a predicate of the appropriate type to refine the selection. For instance, if a user clicks on a particular classification, a classification filter provider may apply or modify a predicate to look for objects classified by this classification. A document type filter provider may modify the type being selected to restrict processing to the document type applied. The system may then execute the resultant search XPath to display a new collection, filtered by the applied filter.

If a filter is removed, the application delegates responsibility for modifying the XPath model to remove the filter to each of the registered filter providers. Each filter provider may then remove the predicate of the appropriate type to remove the refinement. For instance, if the user chooses to remove a particular classification filter, a classification filter provider may modify the predicate that looks for objects classified by this classification, and remove the specific classification from this predicate. A document type filter provider may modify the type being selected for removal of the specific document type. The system may then execute the resultant search XPath to display a new collection, no longer filtered by the removed filter.

The filter provider approach, of embodiments of the present subject matter, is advantageous in that it enables different types of filter providers to be registered with an application without requiring changes to any of the application code. Applying embodiments of the invention in WSRR, such as the WSSR 10, enables the registration of different filter providers on different perspectives within a web user interface, and each filter modifies the search XPath model when applied. The addition of new filter types, using embodiments of the present subject matter, does not require changes to the application code, and any sort of filter may be added if a filter may be represented by a modification to the XPath selection.

The framework, as described, defines a common abstract base class for all filter provider implementations. In a WSRR implementation, such as the example WSSR 10, the filter providers may be referred to as facet providers. The defined abstract base class implements some key functionality that is common to all filter providers, while also defining a number of abstract methods that each filter provider must implement. These methods provide the "hooks" that allow the WSRR to invoke each filter provider at the relevant point when processing a collection of objects (this includes applying/removing a filter to/from a collection of objects as well as extracting the filters for display).

Framework for Saving and Restoring a Selection Filter

Figure 4:
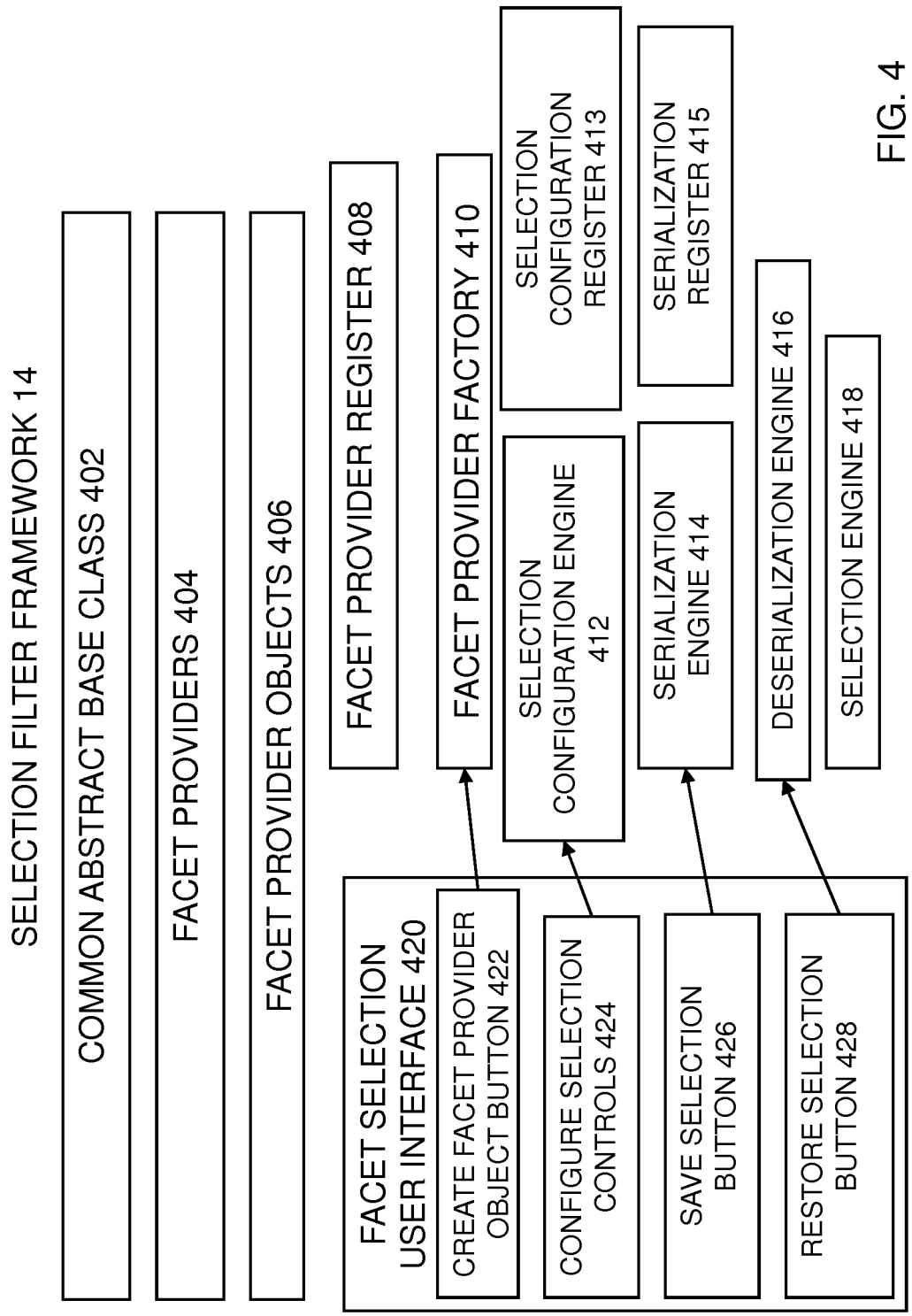
FIG. 4 is a block diagram of an example of an implementation of the selection filter framework of FIG. 2 according to an embodiment of the present subject matter.

FIG. 4 is a block diagram of an example of an implementation of the selection filter framework 14 of FIG. 2. Referring to FIG. 4, there is shown the selection filter framework 14 for selection filter plugins (also called facet providers in this embodiment). The selection filter framework 14 according to the present embodiment comprises: a common abstract base class 402; two or more facet providers 404; two or more facet provider objects 406; a facet provider register 408; a facet provider object factory 410; a selection configuration engine 412; a selection configuration register 413; a serialization engine 414; a serialization register 415; a deserialization engine 416; a selection engine 418, and a facet selection user interface 420. The facet selection user interface 420 comprises a create facet provider object button 422; configure selection controls 424; a save selection button 426; and a restore selection button 428. The common abstract base class 402 for facet providers provides a template for individual facet providers.

Figure 6:
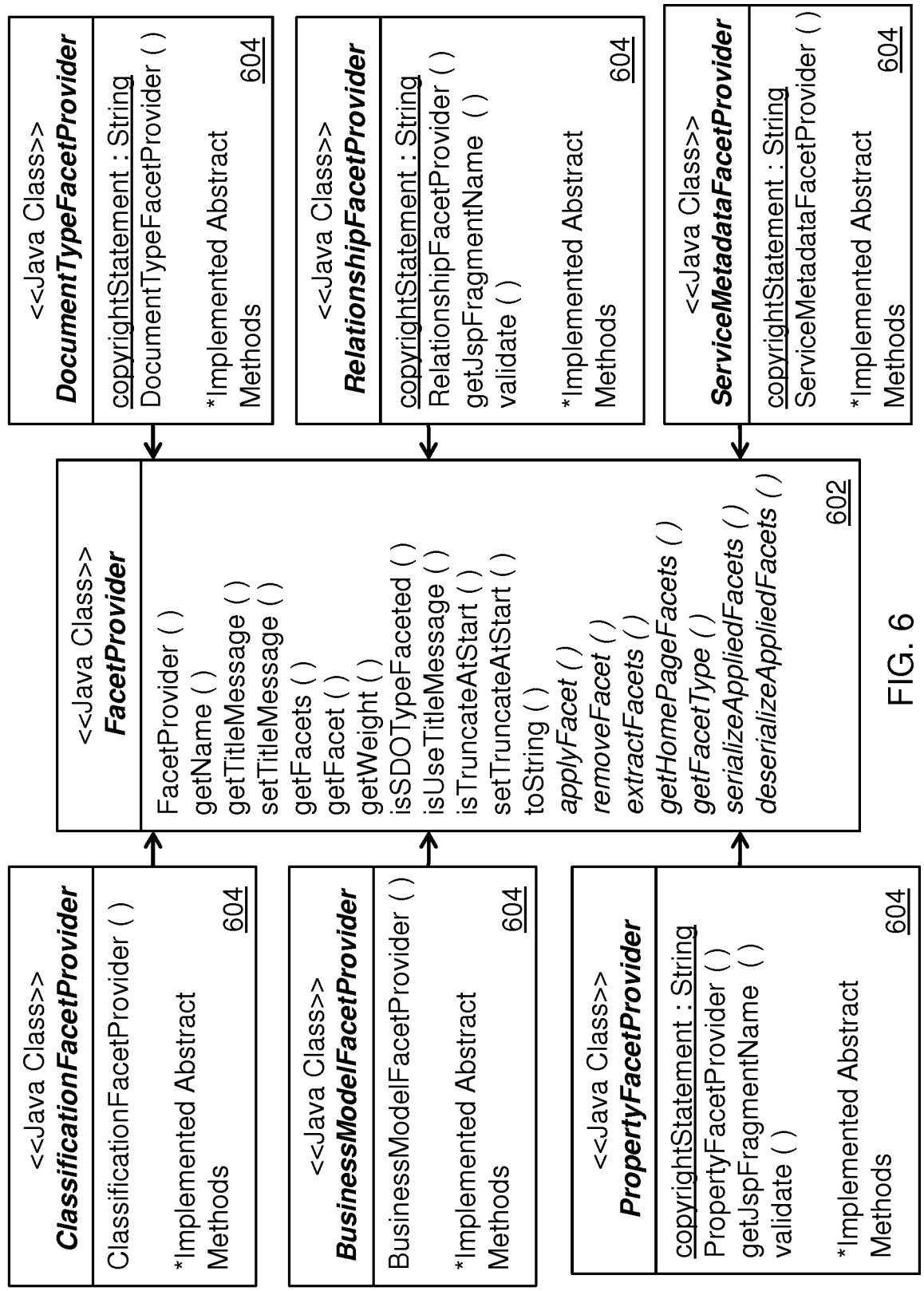
FIG. 6 is a diagram of an example of an implementation of a facet provider abstract base class and facet provider implementations according to an embodiment of the present subject matter.

FIG. 6 is a diagram of an example of an implementation of a facet provider abstract base class and facet provider implementations. As may be seen in FIG. 6 a number of facet providers 604 representing the facet providers 404 are shown linked to a facet provider class 602 that represents the common abstract base class 402 to share common properties and methods.

Facet providers 404/604 are created by a database developer for any facet of the data in the database. In the example of FIG. 6, there is shown a Business Model Facet Provider for different business models; a Classification Facet Provider for different a particular classification; a Document Type Facet Provider to distinguish the different document types; a Property Facet Provider to distinguish the different properties of data; a Relationship Facet Provider to distinguish the different relationships, and a Service Metadata Facet Provider to distinguish the different types of service metadata. Each of these facet providers has its own class but common methods with the facet provider base class 402/602. As such, though not depicted within FIG. 6 due to space limitations on the printed page, each of the facet providers 604 implements functionality (e.g., methods) identified as abstract methods in the facet provider class 602.

Examples of these methods that are implemented by the facet providers 604 include an applyFacet( ) method, a removeFacet( ) method, an extractFacets( ) method, a getHomePageFacets( ) method, a getFacetType( ) method, a serializeAppliedFacets( ) method, and a deserializeAppliedFacets( ) method. Each of the facet providers 604 may also include additional functionality/methods, such as those illustrated within FIG. 6.

Each facet provider object 406 is instantiated in the selection filter framework 14 from a respective facet provider class when a user wants to select a particular facet. The facet provider register 408 registers and stores each facet provider that may be instantiated. The facet provider object factory 410 enables the creation of a facet provider object 406 from a facet provider class when the user selects the create facet provider object button 422. The selection configuration engine 412 allows a user to configure the facet provider objects and the properties of the facet provider objects so that a desired result may be achieved. The user selects the configure selection controls 424 to operate the selection configuration engine. Typically this may be menu driven but may also be command line driven. The resulting configuration of facet providers and properties are saved in the selection configuration register 413. The serialization engine 414 collects, when a user selects the save selection button 426, the associated facet provider objects 406 and serializes each one in turn before saving the serialization as a list in the serialization register 415.

The deserialization engine 416 performs, when a user selects the restore selection button 428, deserialization on the items in the list stored in the serialization register 415. The selection engine 418 performs the selection within the data using the details in the selection configuration register 413.

The facet selection user interface 420 enables the user to create, configure, save and restore faceted selections as described above.

Serializing and Deserializing Selection Strings

Figure 5:
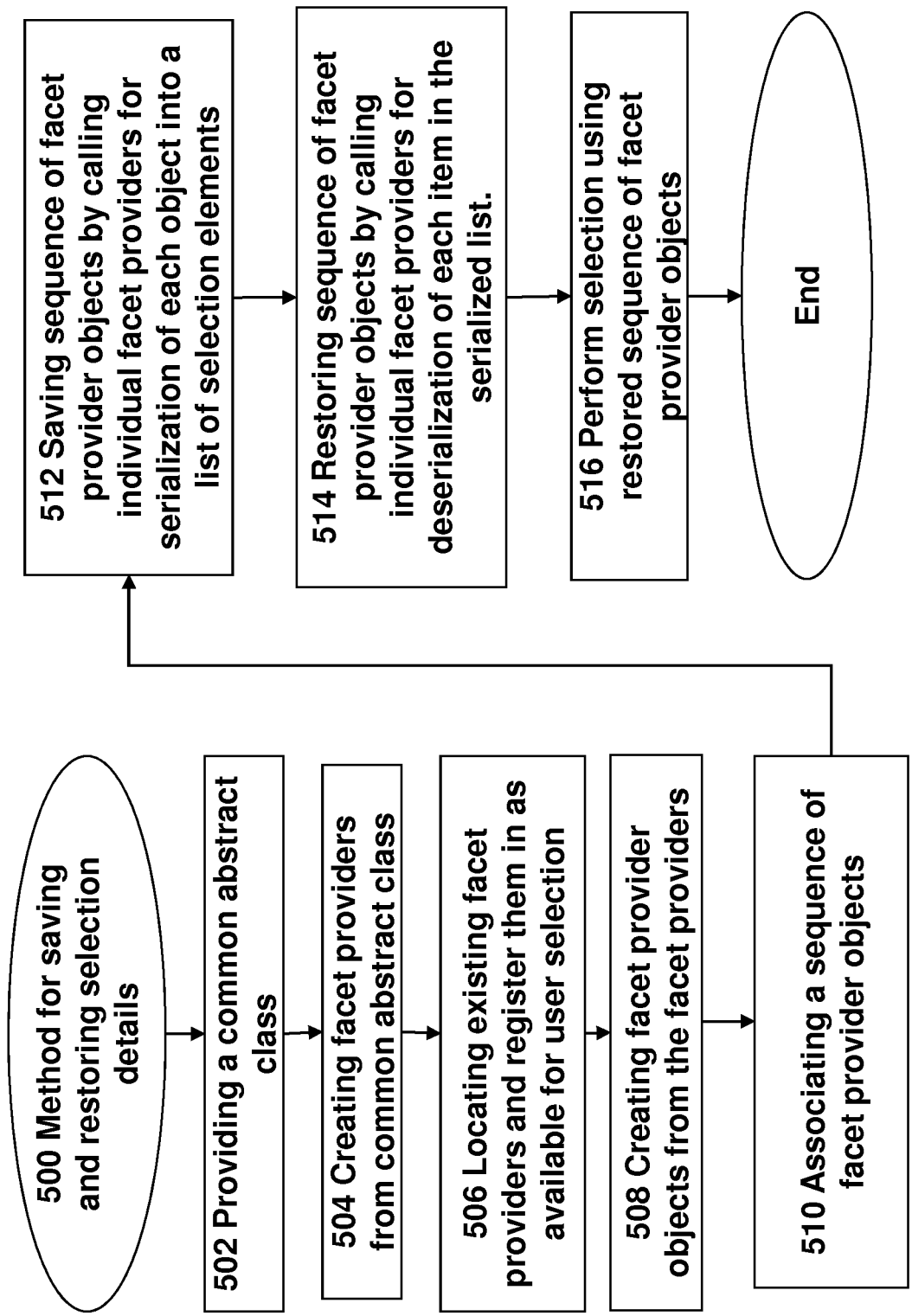
FIG. 5 is a flow chart of an example of an implementation of a process for selection filter plugins for saving and restoring selection details according to an embodiment of the present subject matter.

Referring to FIG. 5, there is shown a method flow 500 of the framework for selection filter plugins for saving and restoring selection details according to an embodiment of the present subject matter.

In step 502, a database, such as the triplestore database 9, provides a common abstract base class for all facet providers implementing the functionality of serialization and deserialization. In step 504, a database administrator or developer creates two or more selection filter plugins (e.g., facet provider classes) from the common abstract base class. Two or more plugins are used in the example since the solution may be demonstrated as a common solution for more than one plugin however the same solution may work for one plugin. In step 506, the database locates and registers selection filter plugins, whereby each selection filter plugin creates at least two selection filter objects. In step 508, the database creates two or more selection filter objects from the selection filter plugins. In step 510, the database, upon a user request to create and configure a selection, associates an ordered sequence of two or more selection filter objects and configures each selection filter object so that the associated selection filter objects are adapted to select successive subsets of data in the registry. For instance, the associated selection filter objects may be adapted to create a simple protocol and resource description framework (RDF) query language (SPARQL), a structured query language (SQL), or XPATH selection string for use by a selection engine.

In step 512, after a user selection of a save feature, the database serializes each associated selection filter object in the sequence, collecting each serialization in an ordered list and saving the list of serializations. The serialization is performed by the respective selection filter objects or the selection filter plugins. Serializing the selection filter objects comprises recording in a list the selection filter object names and properties of state as configured by the user such that the each selection filter object may be recreated in the original state and sequence. In step 514, at a later date and upon a user request to restore the selection, the database deserializes each associated selection filter serialization in the list of serializations into a sequence of configured selection filter objects. The deserialization is performed by the respective selection filter objects or the selection filter plugins.

In step 516, the database performs, upon a user selection of a selection feature, a selection in the database using the deserialized sequence of configured selection filter objects.

Example

FIG. 6 is a unified modeling language (UML) diagram of a FacetProvider abstract base class 602 and facet provider implementations 604 as provided by a WSRR according to embodiments of the present subject matter. Unified modeling language is a standardized general-purpose modeling language in the field of software engineering. UML includes a set of graphical notation techniques to create abstract models of specific systems, referred to as UML model. The graphical nature of UML aids in the visualizing, specifying, constructing, and documenting the artifacts of a software-intensive system. The unified modeling language offers a standard way to write a system's blueprints, including conceptual things such as business processes and system functions, as well as concrete things such as programming language statements, database schemas, and reusable software components.

The applyFacet( ) method is called by an application, according to embodiments of the present subject matter, if a facet provider must apply a facet. It is provided with the Java® XPath model representing the current collection of items and a context, which is specific to the Facet Provider type and represents information about the filter to be applied. For example, for a classification filter, this is the Web Ontology Language (OWL) URI of the particular classification being applied. The applyFacet( ) method modifies the XPath model to apply the filter and then returns. The application then executes the XPath to produce a new collection of items.

The removeFacet( ) method is called by an application, according to embodiments of the present subject matter, if a facet provider must remove a facet. The removeFacet( ) method is provided with the same information as the applyFacet( ) method. The removeFacet( ) method modifies the XPath model to remove the filter and then returns. The application then executes the XPath to produce a new collection of items.

The serializeAppliedFacets( ) method in a particular facet provider may be called by an application if the application wants to serialize a particular facet provider object.

The deserializeAppliedFacets( ) method in a particular facet provider may be called by an application if the application wants to deserialize a particular facet provider object.

The use of an XPath selection, in embodiments of the present subject matter, for selecting for the items displayed in a collection, may be advantageous since this selection may be readily saved into the Registry as another object in the Registry, and the selection may be rerun on demand. However, if items were refined in memory not using an XPath selection expression, the rerunning of the selection may not be possible.

The use of an XPath selection expression allows an administrator or user to refine a collection of items for the needs of their business (e.g., show Production Services in the Finance department), and then save this selection and present the saved selection elsewhere, for example on the navigation tree or home page, so that other users of the Registry may immediately see the collection of items.

In addition, by modifying a selection to apply filters, and because almost any collection of items in the service registry may be represented by a selection, embodiments of the invention may easily filter almost any collection of items in the service registry without writing any code specific to a particular collection of items.

Examples of how the specific facet provider implementations apply facets to the XPath model are as follows.

An example of a XPath expression to retrieve all types of items in the registry which have the name of "service" is:
   //*[@name="service"]

In the event a document type facet provider applies a facet to filter to only show items in the collection which are WSDLServices, the document type facet provider modifies the XPath model to:
   WSRR/WSDLService[@name="service"]

An example of a XPath expression to retrieve all WSDL Documents in the registry which have the name of "service" is:
   WSRR/WSDLDocument[@name="service"]

If a classification facet provider applies a facet to filter to only show items in the collection which are classified by <owl uri>, it modifies the XPath model to:
   WSRR/WSDLDocument[@name="service" AND classifiedByAllOf('<owl uri>')]

If a classification facet provider applies a facet to filter to also only show items in the collection which are classified by <owl uri 2>, it modifies the XPath model to:
   WSRR/WSDLDocument[@name="service" AND classifiedByAllOf('<owl uri>', '<owl uri 2>')]

The framework, provided by embodiments of the present subject matter, also defines an extensible markup language (XML) schema definition that is used to declaratively define Facet Providers to the WSRR. XML files that conform to the XML schema are created and placed in a specific sub-directory within a WSRR web user interface module. Each facet provider that is required to be registered with WSRR must provide its own XML configuration file and place it in this sub-directory. An example of a Facet Provider XML configuration file is shown in Table 1.

TABLE 1

```
<facet-provider-definition
xmlns="http://www.ibm.com/xmlns/prod/serviceregistry/6/1/FacetProviderDefinition"
xmlns:xsi="http://www.w3.org/2001/XMLSchema-instance"
xsi:schemaLocation="http://www.ibm.com/xmlns/prod/serviceregistry/6/1/FacetProviderDefiniti
on ../../../schemas/FacetProviderDefinition.xsd"
facet-provider-name="DocumentTypeFacetProvider"
page-help-topic="detail.view.wsdl"
weight="4">
<messages>
<title-message message-key="facet.provider.document.type.title"/>
</messages>
<facet-provider-class>com.ibm.sr.ui.facetproviders.DocumentTypeFacetProvider</facet-
provider-class>
</facet-provider-definition>
```

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java®, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable storage medium that can direct a computer or other programmable data processing apparatus to function in a particular manner, such that the instructions stored in the computer-readable storage medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed.

Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Abbreviations

J2EE Java® 2 Platform Enterprise Edition
SCA Service Component Architecture
SOA Service oriented architecture
WSDL Web Service Definition Language
WSRR IBM WebSphere Service Registry and Repository
XML extensible mark-up language
XSD XML Schema Definition Notices IBM and WebSphere are registered trademarks or trademarks of International Business Machines Corporation in the United States and/or other countries. Java and all Java-based trademarks are trademarks of Sun Microsystems, Inc. in the United States, other countries, or both. Eclipse is a trademark of Eclipse Foundation, Inc.

What is claimed is:

1. A method, comprising:
providing, as part of executable functionality within a registry, a set of filter provider executable objects that are instantiated into executable form within the registry from a set of coded filter provider class definitions that define (i) coded executable filtering functionality and (ii) coded executable serialization functionality;
associating, via a database application in response to a user request to configure a filtered selection that selects a collection of items from the registry, an ordered sequence of two or more of the filter provider executable objects that each during execution within the registry separately from the database application inspect data in the registry and select successive subsets of the data in the registry according to different selection types successively executed by the two or more of the filter provider executable objects;
serializing, to storage in response to a user selection of a save feature in the database application by execution of the coded executable serialization functionality within one or more of the filter provider executable objects, each associated filter provider executable object in the ordered sequence into a sequenced set of serialized filter provider objects stored as a restorable selection object in the registry that when deserialized and executed in the registry selects one or more new collections of items from the registry according to the different selection types successively executed by the deserialized two or more of the filter provider executable objects; and
constructing a selection statement using a deserialization of the sequenced set of serialized filter provider objects in the restorable selection object that reconstructs the ordered sequence of the two or more of the filter provider executable objects, calculating a difference between the constructed selection statement and an actual selection statement, and appending the selection statement difference to the stored restorable selection object that comprises the sequenced set of serialized filter provider objects in the registry.

2. The method according to claim 1, where serializing, to storage in response to the user selection of the save feature in the database application by execution of the coded executable serialization functionality within the one or more of the filter provider executable objects, each associated filter provider executable object in the ordered sequence into the sequenced set of serialized filter provider objects stored as the restorable selection object in the registry that when deserialized and executed in the registry selects one or more new collections of items from the registry according to the different selection types successively executed by the deserialized two or more of the filter provider executable objects comprises recording in a list the filter provider executable objects' names and properties of state as configured to execute within the registry separately from the database application such that each filter provider executable object is recreated in response to deserialization to execute again within the registry in an original state and sequence.

3. The method according to claim 1, where an ordered list of serializations that identifies the sequenced set of serialized filter provider objects is saved as custom properties of the restorable selection object associated with the filtered selection.

4. The method according to claim 1, further comprising:
providing a coded common abstract base class from which each of the set of coded filter provider class definitions is derived, and from which all filter provider executable objects are instantiated, that defines the coded executable serialization functionality of each filter provider executable object.

5. The method according to claim 1, where:
the set of coded filter provider class definitions further define coded executable deserialization functionality; and
further comprising deserializing, in response to a user request to restore the filtered selection from an application different from the database application, each of the sequenced set of serialized filter provider objects of the stored restorable selection object into the associated filter provider executable object to reconstruct the ordered sequence of the two or more of the filter provider executable objects, where deserialization to recreate each filter provider executable object of the reconstructed ordered sequence is performed by one of the respective filter provider executable object and a filter provider executable object of a same type as the respective filter provider executable object.

6. The method according to claim 5, further comprising:
performing a selection of the collection of items within the registry specified by the filtered selection by executing the deserialized reconstructed ordered sequence of the two or more of the filter provider executable objects; and
providing the collection of items from the registry to the application different from the database application.

7. A computer program product comprising a computer readable storage medium having computer readable program code, where the computer readable program code when executed on a computer causes the computer to:
provide, as part of executable functionality within a registry, a set of filter provider executable objects that are instantiated into executable form within the registry from a set of coded filter provider class definitions that define (i) coded executable filtering functionality and (ii) coded executable serialization functionality;
associate, via a database application in response to a user request to configure a filtered selection that selects a collection of items from the registry, an ordered sequence of two or more of the filter provider executable objects that each during execution within the registry separately from the database application inspect data in the registry and select successive subsets of the data in the registry according to different selection types successively executed by the two or more of the filter provider executable objects;

serialize, to storage in response to a user selection of a save feature in the database application by execution of the coded executable serialization functionality within one or more of the filter provider executable objects, each associated filter provider executable object in the ordered sequence into a sequenced set of serialized filter provider objects stored as a restorable selection object in the registry that when deserialized and executed in the registry selects one or more new collections of items from the registry according to the different selection types successively executed by the deserialized two or more of the filter provider executable objects; and construct a selection statement using a deserialization of the sequenced set of serialized filter provider objects in the restorable selection object that reconstructs the ordered sequence of the two or more of the filter provider executable objects, calculate a difference between the constructed selection statement and the actual selection statement, and append the selection statement difference to the stored restorable selection object that comprises the sequenced set of serialized filter provider objects in the registry.

8. The computer program product according to claim 7, where, in causing the computer to serialize, to storage in response to the user selection of the save feature in the database application by execution of the coded executable serialization functionality within the one or more of the filter provider executable objects, each associated filter provider executable object in the ordered sequence into the sequenced set of serialized filter provider objects stored as the restorable selection object in the registry that when deserialized and executed in the registry selects one or more new collections of items from the registry according to the different selection types successively executed by the deserialized two or more of the filter provider executable objects, the computer readable program code when executed on the computer causes the computer to record in a list the filter provider executable objects' names and properties of state as configured to execute within the registry separately from the database application such that each filter provider executable object is recreated in response to deserialization to execute again within the registry in an original state and sequence.

9. The computer program product according to claim 7, where an ordered list of serializations that identifies the sequenced set of serialized filter provider objects is saved as custom properties of the restorable selection object associated with the filtered selection.

10. The computer program product according to claim 7, where the computer readable program code when executed on the computer further causes the computer to:
provide a coded common abstract base class from which each of the set of coded filter provider class definitions is derived, and from which all filter provider executable objects are instantiated, that defines the coded executable serialization functionality of each filter provider executable object.

11. The computer program product according to claim 7, where:
the set of coded filter provider class definitions further define coded executable deserialization functionality; and
the computer readable program code when executed on the computer further causes the computer to deserialize, in response to a user request to restore the filtered selection from an application different from the database application, each of the sequenced set of serialized filter provider objects of the stored restorable selection object into the associated filter provider executable object to reconstruct the ordered sequence of the two or more of the filter provider executable objects, and where deserialization to recreate each filter provider executable object of the reconstructed ordered sequence is performed by one of the respective filter provider executable object and a filter provider executable object of a same type as the respective filter provider executable object.

12. The computer program product according to claim 11, where the computer readable program code when executed on the computer further causes the computer to:
perform a selection of the collection of items within the registry specified by the filtered selection by executing the deserialized reconstructed ordered sequence of the two or more of the filter provider executable objects; and
provide the collection of items from the registry to the application different from the database application.

* * * * *